United States Patent
Toyooka et al.

(10) Patent No.: US 9,423,549 B2
(45) Date of Patent: Aug. 23, 2016

(54) SURFACE ILLUMINANT DEVICE

(75) Inventors: Kazuhiko Toyooka, Yamagata (JP); Masaki Yamamuro, Tokyo (JP); Hiroki Matsuda, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 58 days.

(21) Appl. No.: 14/233,569

(22) PCT Filed: Jul. 19, 2012

(86) PCT No.: PCT/US2012/047275
§ 371 (c)(1),
(2), (4) Date: Apr. 10, 2014

(87) PCT Pub. No.: WO2013/012974
PCT Pub. Date: Jan. 24, 2013

(65) Prior Publication Data
US 2014/0254195 A1     Sep. 11, 2014

(30) Foreign Application Priority Data

Jul. 19, 2011 (JP) ................................. 2011-158257

(51) Int. Cl.
*G02B 5/02* (2006.01)
*F21V 8/00* (2006.01)
*G02F 1/1335* (2006.01)

(52) U.S. Cl.
CPC ............ *G02B 6/0025* (2013.01); *G02B 5/0205* (2013.01); *G02B 6/0051* (2013.01); *G02F 1/133606* (2013.01); *G02F 1/133611* (2013.01)

(58) Field of Classification Search
CPC .................... G02F 1/133611; G02F 1/133602; G02F 1/133606; G02B 6/0033; G02B 6/005; G02B 6/0065; G02B 5/0205; G02B 5/0236; G02B 5/0242; G02B 5/0247; G02B 6/0025; G02B 6/0051

USPC ........................................................ 362/97.1
See application file for complete search history.

(56) References Cited

U.S. PATENT DOCUMENTS 6,683,717 B1 * 1/2004 Miyatake ........... C09K 19/3852
349/183
7,660,040 B2 * 2/2010 Starry ....................... B32B 5/26
359/599

(Continued)

FOREIGN PATENT DOCUMENTS

CN   101169487   4/2008
EP   2103972     9/2009

(Continued)

OTHER PUBLICATIONS

English Translation—WO 2010/126188, Kim et al, Nov. 4, 2010.*
International Search Report for PCT International Application No. PCT/US2012/047275, Mailed on Oct. 8, 2012, 4 pages.

*Primary Examiner* — Peggy Neils
(74) *Attorney, Agent, or Firm* — Lisa P. Fulton (57) ABSTRACT

A surface light source device capable of obtaining uniform and high brightness emitted light is disclosed. The surface light source device can include a light source (11) that emits light; a light guiding plate (12) that guides light from the light source that is incident on a rear surface side thereof or a side surface side thereof and emits the light from a front surface side thereof; and a diffusion plate (14) disposed on the front surface side of the light guiding plate that diffuses the incident light from the light guiding plate to a front surface side thereof. The diffusion plate can be made from nonwoven fabric with an areal weight of not less than 0 g/m² and not more than 40 g/m².

4 Claims, 9 Drawing Sheets

(56) References Cited

U.S. PATENT DOCUMENTS

| | | | |
|---|---|---|---|
| 8,459,857 B2 * | 6/2013 | Shibata | G02B 6/009 362/607 |
| 9,017,793 B2 * | 4/2015 | Yoshida | 428/142 |
| 2003/0002158 A1 * | 1/2003 | Masaki et al. | 359/599 |
| 2004/0246584 A1 * | 12/2004 | Ahn et al. | 359/599 |
| 2006/0038935 A1 | 2/2006 | Kim | |
| 2007/0189024 A1 * | 8/2007 | Nanbu et al. | 362/458 |
| 2008/0080055 A1 | 4/2008 | Lightfoot | |
| 2008/0174874 A1 * | 7/2008 | Kanaya | 359/599 |
| 2010/0014164 A1 | 1/2010 | O'Brien | |
| 2010/0046204 A1 * | 2/2010 | Shinkai et al. | 362/97.1 |
| 2010/0208165 A1 | 8/2010 | Kamada | |

FOREIGN PATENT DOCUMENTS

| | | | |
|---|---|---|---|
| JP | 8-94810 | 4/1996 | |
| JP | 8-320406 | 12/1996 | |
| JP | 8-327804 | 12/1996 | |
| JP | 8-329715 | 12/1996 | |
| JP | 09304602 | 11/1997 | |
| JP | 2001-55646 | 2/2001 | |
| JP | 2004-151707 | 5/2004 | |
| JP | 2007-140495 | 6/2007 | |
| JP | 2008-112025 | 5/2008 | |
| WO | WO 2010/126188 | * 11/2010 | G02B 5/02 |

* cited by examiner

|  | Reference Example | Practical Example 1 | Practical Example 2 | Practical Example 3 | Practical Example 4 | Practical Example 5 | Practical Example 6 |
|---|---|---|---|---|---|---|---|
| TT% | 50.72 | 96.40 | 71.52 | 58.82 | 51.82 | 44.81 | 37.33 |
| PT% | 0.05 | 11.50 | 1.37 | 0.30 | 0.11 | 0.07 | 0.03 |
| R% | 4.34 | 1.29 | 2.40 | 2.82 | 3.37 | 3.72 | 4.20 |
| TR% | 52.49 | 35.13 | 45.24 | 52.66 | 61.17 | 66.92 | 69.90 |

| Sample | Material - amount per area (g/sqm) | Size (%) | Total luminous transmittance (%) | Gain |
|---|---|---|---|---|
| A5170 | Ester type 50 | 98.08 | 61.89 | 1.012 |
| E05050 | Ester type 50 | 96.83 | 62.74 | 1.019 |
| EO5070 | Ester type 70 | 97.75 | 57.38 | 0.971 |
| ET5040 | Ester type 40 | 95.52 | 68.05 | 1.034 |
| NO3050 | Nylon type 50 | 96.07 | 53.83 | 0.987 |
| NO5030 | Nylon type 30 | 80.62 | 73.34 | 1.026 |
| NO5050 | Nylon type 50 | 96.90 | 51.35 | 0.957 |
| P03030 | Polypropylene type 30 | 86.55 | 81.01 | 1.050 |
| PMA013 1 sheet | Polypropylene type 13 | 82.88 | 88.17 | 1.054 |
| PMA013 2 sheet | Polypropylene type 26 | 98.57 | 70.60 | 1.056 |
| PMA013 3 sheet | Polypropylene type 39 | 98.33 | 58.61 | 1.037 |
| PMA013 4 sheet | Polypropylene type 52 | 98.68 | 50.47 | 1.003 |
| PMA013 5 sheet | Polypropylene type 65 | 98.82 | 43.47 | 0.978 |
| PMA013 6 sheet | Polypropylene type 78 | 98.83 | 39.28 | 0.939 |
| PMA013 7 sheet | Polypropylene type 91 | 98.89 | 35.96 | 0.895 |
| PMA013 8 sheet | Polypropylene type 104 | 98.83 | 32.11 | 0.863 |
| PMA013 9 sheet | Polypropylene type 117 | 98.83 | 29.53 | 0.851 |
| PMA013 10sheet | Polypropylene type 130 | 98.86 | 28.62 | 0.823 |

| | Average brightness (cd/sqm) | Uniformity properties (/mm) |
|---|---|---|
| Reference Example | 88.9 | 0.0498 |
| Practical Example 1 | 79.0 | 0.0322 |
| Practical Example 2 | 80.3 | 0.0344 |

| Sample | Peak brightness (cd/sqm) | Peak brightness direction ratio | Average brightness (cd/sqm) | Average brightness direction ratio |
|---|---|---|---|---|
| Reference Example 1 | 162.9 | 1.00 | 112.1 | 1.00 |
| Reference Example 2 | 270.9 | 1.66 | 186.6 | 1.57 |
| Practical Example 1 | 147.2 | 1.00 | 107.7 | 1.00 |
| Practical Example 2 | 266.2 | 1.81 | 187.7 | 1.74 |

FIG. 14

| Sample | Peak brightness (cd/sqm) | Peak brightness direction ratio | Average brightness (cd/sqm) | Average brightness direction ratio |
|---|---|---|---|---|
| Reference Example 1 | 156.1 | 1.00 | 116.3 | 1.00 |
| Reference Example 2 | 252.5 | 1.62 | 116.4 | 1.00 |
| Practical Example 1 | 126.9 | 1.00 | 106.9 | 1.00 |
| Practical Example 2 | 227.9 | 1.80 | 116.1 | 1.09 |

# SURFACE ILLUMINANT DEVICE

FIELD

The present disclosure relates to a surface light source device.

BACKGROUND

Conventionally surface light source devices are used as back lights in display devices that use, for example, liquid crystal panels or the like. For example, in Patent Document 1, a surface light source device in which a light diffusion plate made from an ultra high molecular weight plastic porous film disposed on one side of a light guiding plate is disclosed as this type of surface light source device.

SUMMARY

One aspect of the present disclosure is a surface light source device, including a light source that emits light; a light guiding plate that guides light from the light source that is incident on a rear surface side or a side surface side thereof and emits the light from a front surface side thereof; and a diffusion plate disposed on the front surface side of the light guiding plate, that diffuses the incident light from the light guiding plate to a front surface side thereof. The diffusion plate is made from nonwoven fabric with an areal weight of not less than 10 g/m² and not more than 40 g/m².

Another aspect of the present disclosure is a surface light source device, including a light source that emits light; and a diffusion plate that diffuses to a front surface side thereof the light from the light source incident on a rear surface side thereof. The diffusion plate is made from nonwoven fabric with a real weight of not less than 10 g/m² and not more than 40 g/m².

DETAILED DESCRIPTION

The following is a detailed explanation of the various embodiments of the surface light source device according to the present disclosure, with reference to the drawings. In the explanations of the drawings, duplicate explanations of the same element with the same reference numeral are omitted.

In the conventional diffusion plate, the difference between the diffractive index of the molecules or beads which constitute the diffusion element and the binder is small, so the optical losses at the boundary part thereof cannot be ignored. Therefore it is considered that in order to realize a surface light source device that emits uniform and high brightness light, it may be necessary to both ensure the diffusibility of the diffusion plate and improve brightness.

Figure 1:
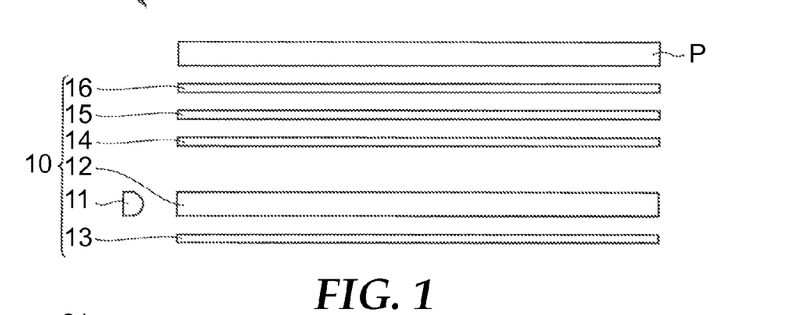
FIG. 1 is a schematic view illustrating the configuration of a surface light source device according to an embodiment of the present disclosure.

FIG. 1 is a schematic view illustrating the configuration of a surface light source device according to an embodiment of the present disclosure. As illustrated in this drawing, a surface light source device 10 includes a light source 11, a light guiding plate 12, a reflection plate 13, a diffusion plate 14, a prism sheet 15, and a reflecting polarizing plate 16. The surface light source device 10 is combined with, for example, a liquid crystal panel P, to constitute a liquid crystal display module 1 that is used in monitors of televisions or personal computers.

For example a commonly known liquid crystal cell such as TFT or STN, IPS, or VA, to the surface of which a linear polarizing plate or the like is fixed is used in the liquid crystal panel P. The liquid crystal cells include, for example, a plurality of substrates, an electrode provided for each substrate, and liquid crystal layers sealed between substrates, orientation membranes, spacers, color filters, and so on. The light source 11 in this example is shown as an LED (light emitting diode). A row of a plurality of light sources 11 is disposed at predetermined intervals along a side surface of the light guiding plate 12. A cold cathode fluorescent lamp (CCFL) or the like can be used as the light source 11. Also, the light source 11 can be disposed along the rear side surface of the light guiding plate 12, or the two opposing side surfaces of the light guiding plate 12, or along all side surfaces of the light guiding plate 12.

The light guiding plate 12 is a plate shaped member with a thickness of several mm, formed from a transparent material such as acrylic resin or the like, for example. The refractive index of the light guiding plate 12 is set to about 1.5, for example. The light guiding plate 12 guides the light incident on the side surfaces from the light sources 11 and emits it from the front surface. If necessary, various addiditives such as light diffusion agent, ultraviolet light absorbent agent, thermal stabilizing agent, and photopolymerization stabilizing agent can be added to the light guiding plate 12.

A resin plate shaped member with a silver or aluminum foil film bonded to the surface thereof, or a reflective film made of a dielectric with an ultra-multi layer construction, or the like, can be used as the reflection plate 13. The reflection plate 13 is disposed on the rear surface side of the light guiding plate 12, to ensure the brightness of the light emitted from the surface light source device 10 by reflecting the light that leaks from the rear surface side of the light guiding plate 12 towards the light guiding plate 12. The reflection plate 13 may be a resin plate that has been colored white on the surface thereof, or a metal plate made from aluminum or the like.

The diffusion plate 14 is a plate shaped member formed from a nonwoven fabric, for example. The diffusion plate 14 is disposed on the front surface side of the light guiding plate 12, and ensures the uniformity of the light emitted from the surface light source device 10 by diffusing over the front surface side the light from the light guiding plate 12 incident on the rear surface side.

For example, general purpose plastics such as polyethylene, polypropylene, and polyethylene terephthalate, or engineering plastics such as polybutylene terephthalate, and polyphenylene sulfide, for example, can be used as the resin from which the nonwoven fabric is made. In the diffusion plate 14, the areal weight of the nonwoven fabric is, for example, not less than 10 $g/m^2$ and not more than 40 $g/m^2$. Also, low light absorption and high transmittance are desirable as basic properties required of the above resin. In the case of a single test specimen of 50 microns thickness, a material with total luminous transmittance of not less than 70% or preferably not less than 80% may be used. In this case the total luminous transmittance can be measured by preparing a single test specimen 50 microns thick from the resin used, and using the method specified in JIS K 7361-1 (1997).

The prism sheet 15 is a sheet shaped member formed from, for example, a material having a transparency similar to that of the light guiding plate 12. Prisms for arranging and modifying the direction of emission of the light that has passed through the diffusion plate 14 are disposed in a plurality of arrays on the front surface or the rear surface of the prism sheet 15. Specifically, the prism sheet 15 includes a first polymer layer having, for example, a microstructure surface, and a second polymer layer disposed on the side opposite the microstructure surface, and the microstructure surface includes the arrays of prisms for shaping the light. As a result of the refraction and total reflection of the prism sheet 15, a part of the light is oriented towards the front surface direction, and the rest of the light is returned to the nonwoven fabric side (light source 11 side). As a result the returned light impinges on the nonwoven fabric, and after being again dispersed and diffused with low loss, and either passing through or being reflected by each member, it is again irradiated in the direction from the nonwoven fabric to the prism. Therefore, as a result, it is possible to more effectively increase the brightness in the screen front surface direction.

The reflecting polarizing plate 16 is a plate shaped member that includes at least two polymer layers. The reflecting polarizing plate 16 is disposed on the front surface side of the prism sheet 15, and based on the difference in the refractive index between the polymer layers, light in a first polarization state is reflected, and light in a second polarization state that is approximately orthogonal to the first polarization state is transmitted.

At least one layer of the polymer layers can include naphthalate functionality. This naphthalate functionality is incorporated into the polymer layer by polymerizing one or more monomers having naphthalate functionality. Examples of the monomer include naphthalate such as 2, 6- or 1, 4- or 1, 5- or 2, 7- or 2,3-naphthalene dicarbonate and esters thereof. Also, at least one polymer layer can include, for example, polyethylene naphthalate (PEN), which is a copolymer of 2, 6- or 1, 4- or 1, 5- or 2, 7- or 2,3-naphthalene dicarbonate and ethylene glycol.

Figure 2:
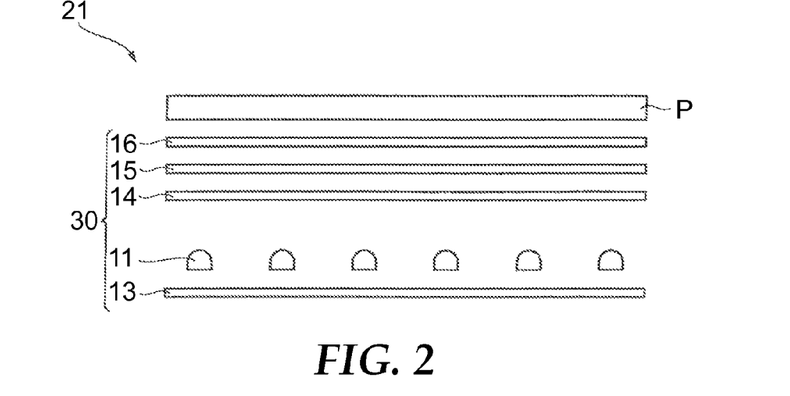
FIG. 2 is a schematic view illustrating the configuration of a surface light source device according to another embodiment of the present disclosure.

Also, FIG. 2 is a schematic view illustrating the configuration of a surface light source device according to another embodiment of the present disclosure. A surface light source device 30 that constitutes a liquid crystal display module 21 illustrated in this drawing differs from the embodiment illustrated in FIG. 1 in that there is no light guiding plate 12, the light sources 11 are incident on the rear surface, and light from the light sources 11 is first incident upon the diffusion plate 14. Also, the reflection plate 13 is disposed on the rear surface side of the light sources 11. All other points are the same as the embodiment illustrated in FIG. 1.

In the surface light source devices 10, 30 having the constitutions as described herein, the diffusion plate 14 disposed on the front surface side of the light guiding plate 12 or the front surface side of the light sources 11 can be formed from nonwoven fabric of not less than 10 $g/m^2$ and not more than 40 $g/m^2$. In a diffusion plate in which, for example, a light diffusion agent such as acrylic beads or the like is retained in a binder, as in a conventional diffusion plate, the difference in refractive index between the beads, which are the diffusion elements, and the binder is small, so to obtain sufficient diffusion it is necessary to have many optical interfaces, and therefore optical losses may occur at these interfaces.

In contrast, in the diffusion plate 14 that uses the nonwoven fabric as described herein, there is sufficient difference in refractive index between the resin that constitutes the nonwoven fabric and the surrounding air, so it is possible to reduce the optical losses when diffusing the light at the interfaces of the nonwoven fabric. Here, if the areal weight of the nonwoven fabric is reduced the diffusibility of the diffusion plate 14 tends to reduce and the transmittance increases. Also, if the areal weight of the nonwoven fabric is increased the diffusibility of the diffusion plate 14 tends to increase and the transmittance reduces. However, if the areal weight of the nonwoven fabric is increased above a specific amount, the diffusibility of the diffusion plate 14 saturates.

Therefore, in some embodiments, by making the areal weight of the nonwoven fabric not less than 10 $g/m^2$ and not more than 40 $g/m^2$, as in the above embodiments, it is possible to obtain a high level of both the diffusibility and transmittance of the diffusion plate 14. As a result it is possible to obtain uniformity and high brightness of the light emitted from the surface light source devices 10, 30. In the display of the liquid crystal panel P, by making the light emitted from the surface light source devices 10, 30 uniform, it is possible to eliminate unevenness (hot spots) in the light due to parts where the light sources 11 are located and where they are not located.

Figure 3:
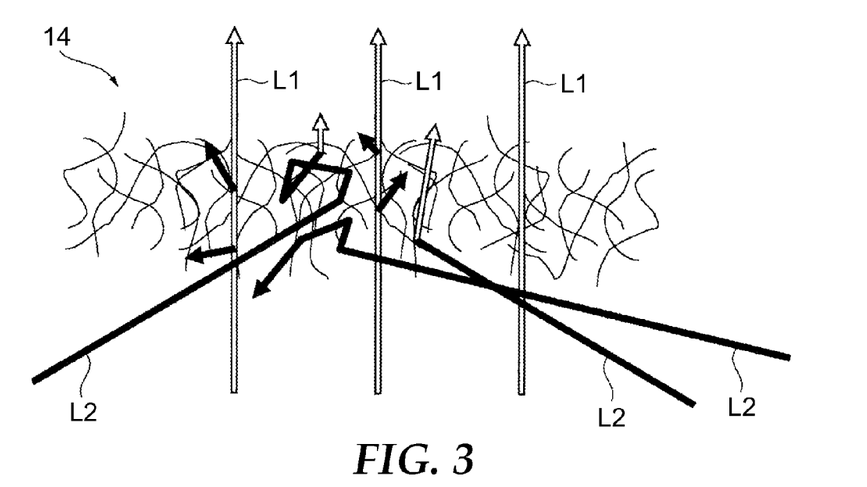
FIG. 3 illustrates the transmission and diffusion of light through a nonwoven fabric.

Also, as illustrated in FIG. 3, in the diffusion plate 14 using the nonwoven fabric, light L1 that is incident on the diffusion plate 14 at approximately right angles is partly diffused, but is transmitted to the front surface side of the diffusion plate 14 with the losses kept low. Therefore, in some embodiments, it is desirable that the resin used in the nonwoven fabric has low light absorption and high transmittance. On the other hand, light L2 that is incident on the diffusion plate 14 at an angle is generally diffused by the nonwoven fabric, and a part of the light L2 passes through the front surface of the diffusion plate 14 in the same manner as for the light L1. Therefore, at the front surface side of the diffusion plate 14, the strength of the light emitted at approximately right angles to the diffusion plate 14 can be higher than the strength of the light incident at approximately right angles on the rear surface side of the diffusion plate 14.

This improvement in brightness can be further increased by disposing the diffusion plate 14 and the reflection plate 13 in opposition, as illustrated in FIG. 1 and FIG. 2. In other words, by disposing the diffusion plate 14 and the reflection plate 13 in opposition, the light reflected to the rear surface side of the diffusion plate 14 at the interfaces of the nonwoven fabric is reflected at the reflection plate 13 and is again incident on the diffusion plate 14, so it is possible to increase the light passing through the front surface of the diffusion plate 14 in the same direction as the light L1.

In the constitution in which the diffusion plate 14 and the reflection plate 13 are disposed in opposition, a reflective polarizing plate can be further provided on the front surface side of the diffusion plate 14. A reflective polarizing plate is a polarizing plate that normally selectively transmits light vibrating in a direction parallel to one in-plane axis (transmission axis), and can reflect all other light. In other words, of the light incident on the reflective polarizing plate, the polarizing effect is exhibited by only transmitting the components of light vibrating in the direction parallel to the transmission axis. Light that has not been transmitted through the reflective polarizing plate is reflected without being substantially absorbed by this reflective polarizing plate. Therefore, the light reflected in the reflective polarizing plate is returned to the diffusion plate 14, is repeatedly diffused and dispersed in the diffusion plate 14, and a part of the polarized light is consumed. The polarized light from which a part has been consumed is again returned to the reflective polarizing plate, and, as described above, only a part is transmitted, and the other part is reflected. In this way, the light is recycled between the reflection plate 14 and the reflective polarizing plate, and at this time the above behavior of the light at the diffusion plate 14 is repeated, so it is possible to further increase the strength of the light emitted in the direction at approximately right angles.

EXAMPLES

Next, effect confirmation tests on the diffusion plate 14 used in the surface light source device 10 according to the present disclosure are explained. In these effect confirmation tests, first the optical properties of the nonwoven fabric sheet were measured. All the following measurements were carried out in a standard atmosphere at a temperature of 23° C. ±2° C. and relative humidity of 50%±10%, which is a class 2 tolerance for the test atmosphere and environment as specified by JIS K 7100 (1999).

In the measurements, nonwoven fabric PMA013, manufactured by Asahi Kasei Fibers Corporation was used, and Working Examples 1 through 6 were prepared as diffusion plates, made from 1 to 6 layers respectively of the nonwoven fabric. One sheet of nonwoven fabric PMA013 weighed 13 g/m². Also the PMA013 was heated and melted to produce a test specimen 50 microns thick, and when the total transmittance was measured in accordance with JIS K 7631-1, a result of 71.8% was obtained.

For the Comparative Example, a 2 mm thick diffusion plate made from styrene methyl methacrylate copolymer resin in which a light diffusing agent was dispersed was used. The optical properties of this diffusion plate when measured by the method in accordance with JIS K 7136 (2000) with a D65 light source using a hazemeter NDH 2000, manufactured by Nippon Denshoku Industries Co., Ltd., were a total transmittance of 53.8% and a haze of 99.5%.

Four optical properties were evaluated: the total transmittance (TT), the parallel transmittance (PT), the absolute reflectance at 12 degrees angle of incidence (R), and the total reflectance (TR).

Figure 4A:
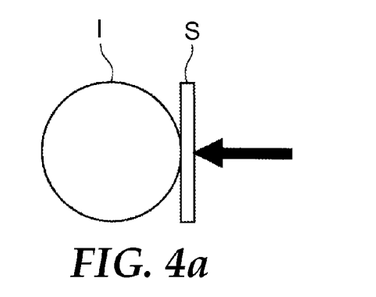
FIG. 4 schematically illustrates effect confirmation tests.
Figure 4B:
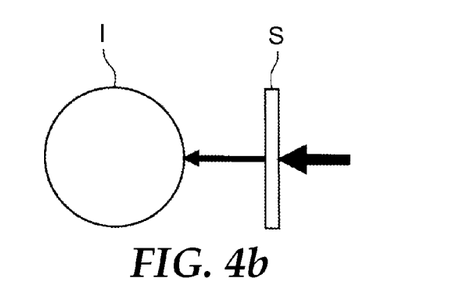

The total transmittance (TT) was measured as illustrated in FIG. 4A by placing an integrating cube I in contact with the front surface side of a sample S, and measuring the strength of light transmitted from the rear surface side of the sample S to the front surface side. Also, the parallel transmittance (PT) was measured as illustrated in FIG. 4B by placing the integrating cube I a predetermined distance from the front surface side of the sample S, and measuring the strength of light transmitted from the rear surface side of the sample S to the front surface side.

Figure 4C:
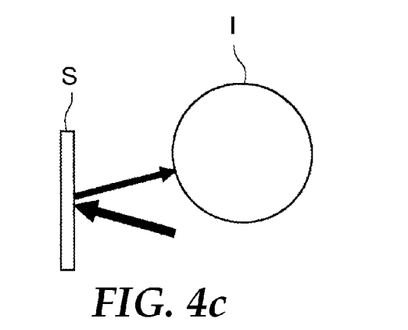

The absolute reflectance at an angle of incidence of 12 degrees (R) was measured as illustrated in FIG. 4C by placing the integrating cube I to the rear surface side of the sample S, and measuring the strength of the light reflected from the rear surface of the sample S at an angle of approximately 12 degrees. For measuring the total transmittance (TT), the parallel transmittance (PT), and the absolute reflectance at an angle of incidence of 12 degrees (R), a Shimadzu Corporation UV-VIS-NIR scanning spectrophotometer UV-3100PC was used, and the measurement conditions were wavelength: 400 nm to 700 nm, scan speed: standard, scan interval: 0.5 nm, and scan width: 1.0 nm.

Figure 4D:
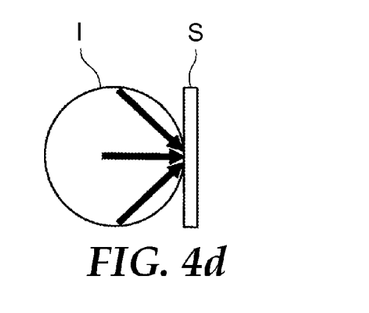

On the other hand, the total reflectance (TR) was measured as illustrated in FIG. 4D, by placing the integrating cube I in contact with the front surface side of the sample S, and measuring the reflection of light from the integrating cube I towards the front surface of the sample S using the integrating cube I. A spectrophotometer U-4000, manufactured by Hitachi High-Technologies Corporation, was used for measuring the total reflectance (TR), and the measurement conditions were wavelength: 400 nm to 700 nm, and scan interval: 0.5 nm.

Figure 5:
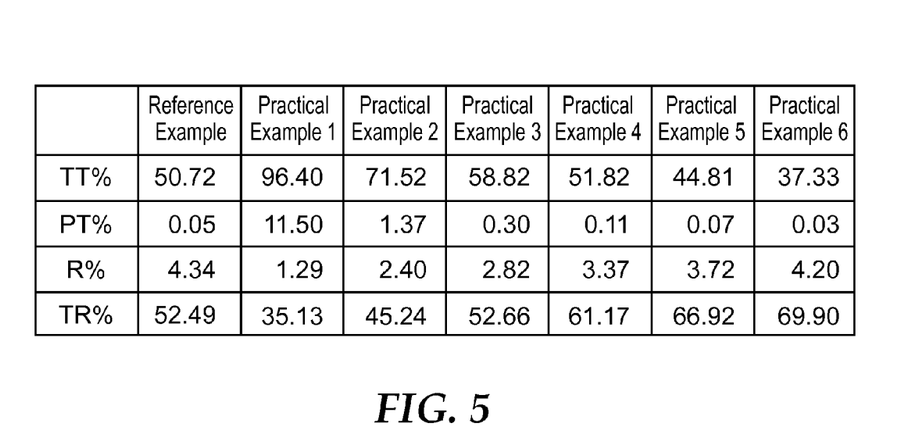
FIG. 5 shows the optical properties of the Working Examples and Comparative Example.

FIG. 5 shows the measurement results. As shown in this figure, for example in Working Example 4, although the total transmittance (TT) was virtually the same as the Comparative Example, the total reflectance (TR) was about 10% higher. This demonstrates the high diffusibility of the diffusion plate using the nonwoven fabric. Also, for example in Working Example 3, although the total reflectance (TR) was virtually the same as the Comparative Example, the total transmittance (TT) was about 10% higher. This demonstrates the low loss of the diffusion plate using the nonwoven fabric.

Figure 6:
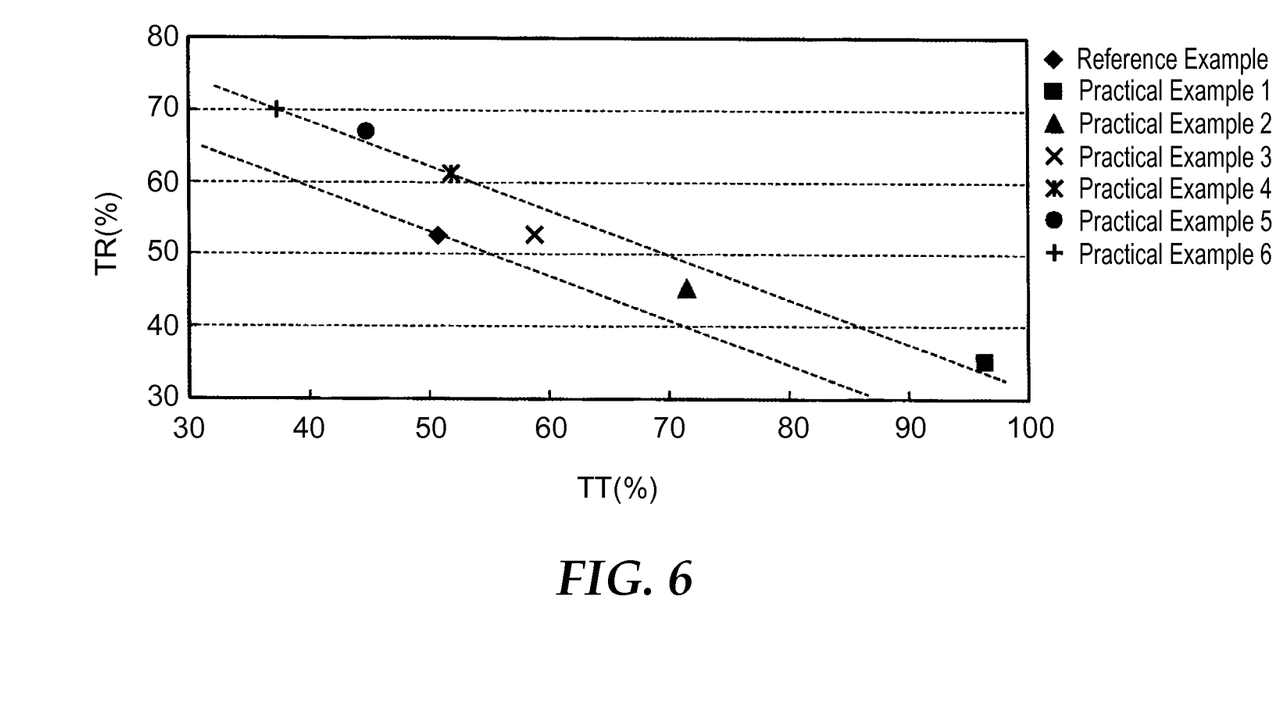
FIG. 6 shows the relationship between the total transmittance and the total reflectance of the Working Examples and the Comparative Example.

FIG. 6 is a graph of the measurement results with total transmittance (TT) on the horizontal axis and total reflectance (TR) on the vertical axis. As shown in this figure, there is a tradeoff relationship between the total transmittance (TT) and the total reflectance (TR) depending on the areal weight of the nonwoven fabric, but it is possible to see that for Working Examples 1 to 6 the tradeoff relationship between the total transmittance (TT) and the total reflectance (TR) is about 10% higher compared with the Comparative Example.

Figure 7:
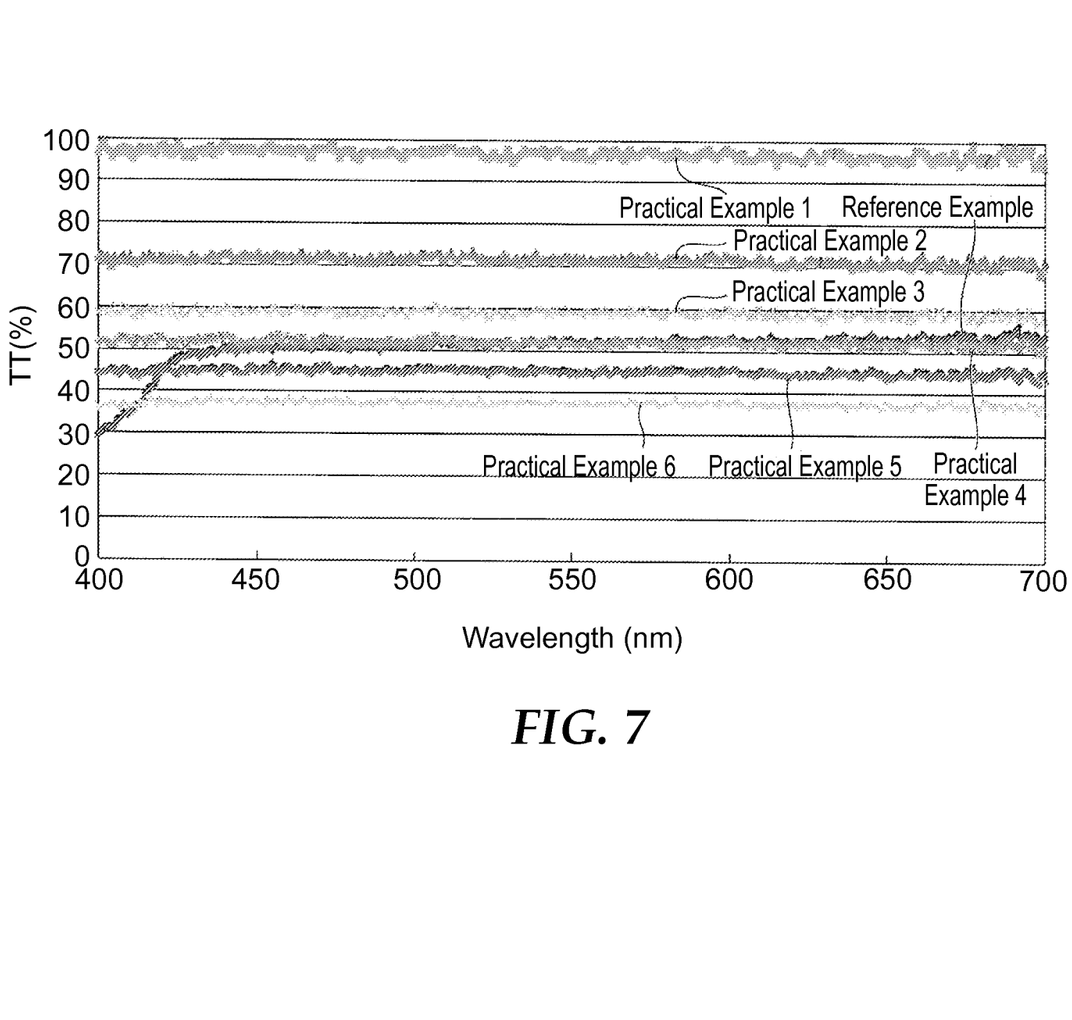
FIG. 7 shows the relationship between the wavelength and the total transmittance of the Working Examples and the Comparative Example.

FIG. 7 is a graph of the measurement results with wavelength on the horizontal axis and total transmittance (TT) on the vertical axis. As shown in this figure, in the Comparative Example there is a reduction in the transmittance over the wavelength range 400 nm to 450 nm, but in contrast in the Working Examples 1 to 6, the transmission spectrum is virtually flat over the whole visible range from 400 nm to 700 nm. From this it can be seen that Working Examples 1 to 6 are achromatic compared with the Comparative Example.

Next, measurements were carried out on the gain, haze, and total transmittance for several nonwoven fabrics. All measured samples are made by Asahi Kasei Fiber Corporation.

To measure the gain, a spectrophotometer PR-650, manufactured by Photoresearch, a Melles Griot polarizer P/N 03 FPG 007 (single transmittance 32%, paralleled nicols transmittance≥20%), a light box with a 6.3 mm thick Teflon® diffusion plate directly below, and a Fostec light source device DCRIIw (lamp EKE: 21 V, 150 W) were used.

The gain was obtained from the following equation. If the light box emission spectrum is $L_{LB}(\lambda)$ and the emission spectrum when the sample is placed in the light box is $L_{sample}(\lambda)$, then the transmittance $T_{sample}(\lambda)$ is obtained from the following Equation (1).

$$T_{sample}(\lambda)=L_{sample}(\lambda)/L_{LB}(\lambda) \quad (1)$$

Also, the back light emission spectrum when the sample is placed in the light box $L_{BL\text{-}sample}(\lambda)$ is obtained from, $$L_{BL\text{-}sample}(\lambda)=L_{LB}(\lambda) \times T_{sample}(\lambda) \quad (2)$$

Also, if the correction term is $V(\lambda)$, the back light brightness when the sample is placed in the light box $B_{sample}$ is obtained from the following Equation (3).

$$B_{sample}=\int V(\lambda) \cdot L_{BL\text{-}sample}(\lambda) \quad (3)$$

Also, the back light brightness $B_{BL}$ is obtained from, $$B_{BL}=\int V(\lambda) \cdot L_{LB}(\lambda) \quad (4)$$

From Equations (3) and (4) above, the gain (effective transmittance) is obtained from the following Equation (5).

$$\text{Gain}=B_{sample}/B_{BL} \quad (5)$$

Figure 8:
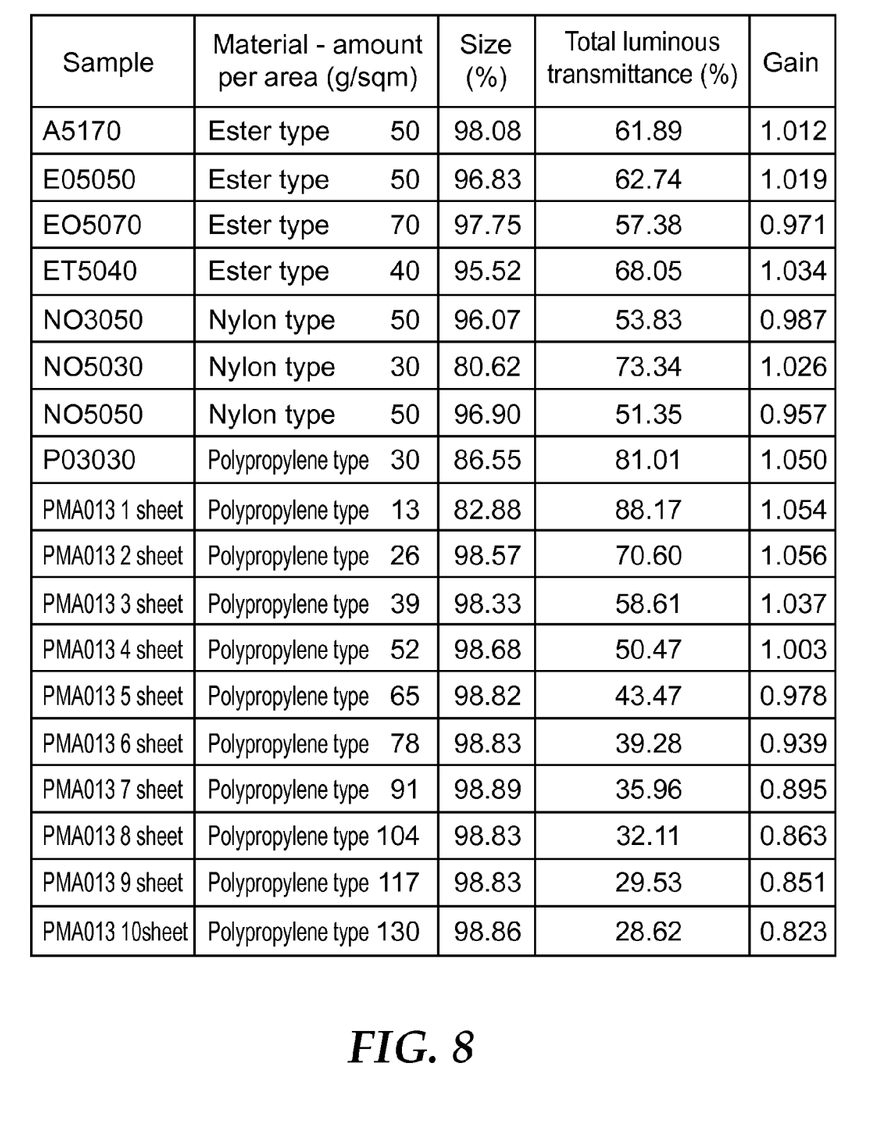
FIG. 8 shows the relationship between the gain and haze of the nonwoven fabric.

The haze was measured by the method in accordance with JIS K 7136 (2000) with a D65 light source using a hazemeter NDH 2000, manufactured by Nippon Denshoku Industries Co., Ltd. The measurement results are shown in FIG. 8.

The total transmittance is an index that indicates how small the loss (absorption) is when light is transmitted, and represents the optical efficiency in all directions of the material itself, regardless of the direction of the light; in contrast, the gain is an index that indicates how much light is emitted in the direction normal to the light emitting plane in surface light source devices such as liquid crystal displays, and the like, or how bright the light appears to an observer, In some embodiments, it may be desirable that the diffusion plate exhibit high haze, e.g., a haze of at least 80%, and high gain, e.g., a gain of at least 1.025.

Figure 9:
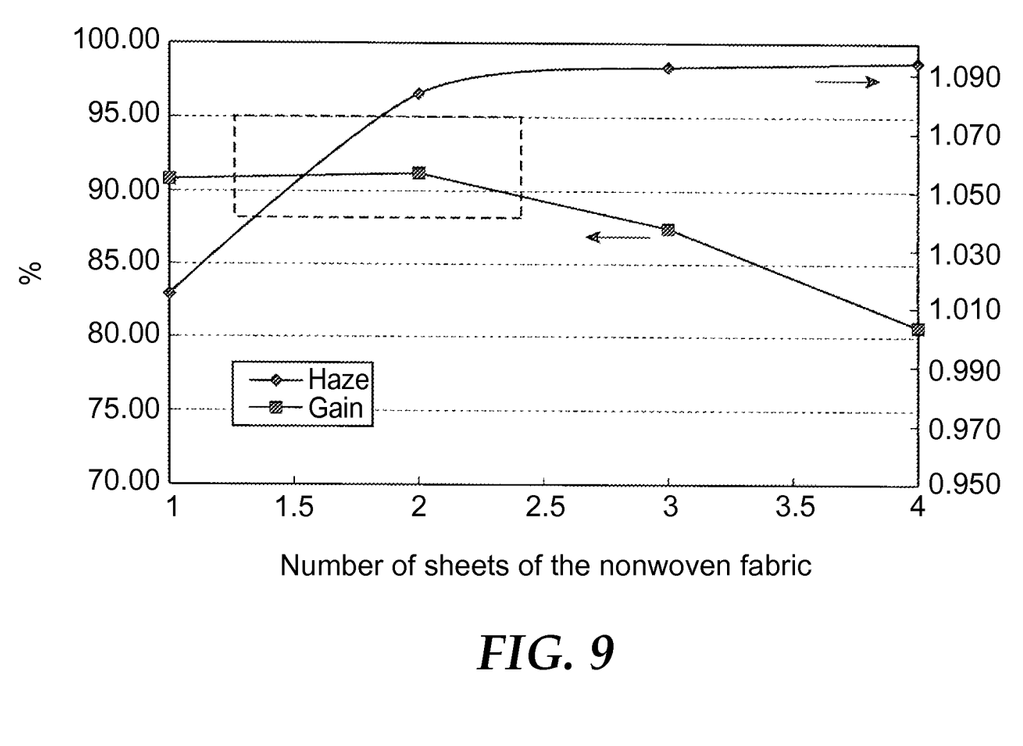
FIG. 9 shows the relationship between the number of sheets of nonwoven fabric and the gain and haze.

When nonwoven fabric is applied to the diffusion plate, the gain and haze can be adjusted by modifying the number of sheets (the areal weight) of nonwoven fabric. FIG. 9 shows the relationship between the number of sheets of nonwoven fabric and the gain and haze.

As shown in FIG. 9, the gain of the diffusion plate tends to gradually decrease when the number of sheets of nonwoven fabric exceeds about two. On the other hand, the haze of the diffusion plate increases as the number of sheets of nonwoven fabric increases, but the value saturates at more than about 2.5 sheets.

When the number of sheets of nonwoven fabric is in the range of about 1.2 to 2.4, the reduction in gain is small and the haze is not saturated. If this number of sheets of nonwoven fabric is converted into areal weight, it corresponds to 10 g/m$^2$ to 40 g/m$^2$. Therefore, it can be seen that if the diffusion plate is constituted from nonwoven fabric with an areal weight of 10 g/m$^2$ to 40 g/m$^2$, it is possible to achieve both permeability and diffusibility of the diffusion plate.

Next, the light unevenness (LED hot spot) elimination performance of the nonwoven fabric was evaluated. In this evaluation a Toshiba TV set REGZA RE1 (37 inch) was used. The surface light source device used in this TV set includes, from the liquid crystal panel side, a reflective polarizing plate, a prism sheet 1, a prism sheet 2, a light guiding plate, and a reflection plate. Of these, the prism sheet 1 and the prism sheet 2 were removed, and the other members were evaluated as a TV set.

A diffusion plate with brightness enhancement function used in another TV set, the 40EX-700, made by Sony, was used as the Comparative Example, the diffusion plate was replaced with a nonwoven fabric AC5050, made by Asahi Kasei Fiber Corporation, to obtain Working Example 1, and the diffusion plate was replaced with a nonwoven fabric PMA013 (two sheets), made by Asahi Kasei Fiber Corporation, to obtain Working Example 2, and the brightness distribution of the liquid crystal panels was measured using a color analyzer. The thickness of the diffusion plate with brightness enhancement function extracted from the 40EX-700 was 205 microns, and when measured by the method in accordance with JIS K 7136 (2000) with a D65 light source using a hazemeter 2000, manufactured by Nippon Denshoku Industries Co., Ltd., the total transmittance was 78.0% and haze was 94.5%.

The color analyzer used was a 2D color analyzer CA-1500W, manufactured by Konica Minolta. Also, the measurement conditions were all set automatically for shutter speed, light strength, and measurement speed, and the range was 1.0 m, the measurement distance was 0.52 m, and the incident angle was 10°. Also, in order to make observation of the light source easier, the original 56 LEDs provided in the TV set were alternately turned on and off to make the LED number 28, and the measurements were carried out with the outside bezel removed. Every time each sample for measurement was replaced, 15 minutes was allowed after the TV was turned on, and after the stability of brightness was confirmed the data was obtained.

Figure 10:
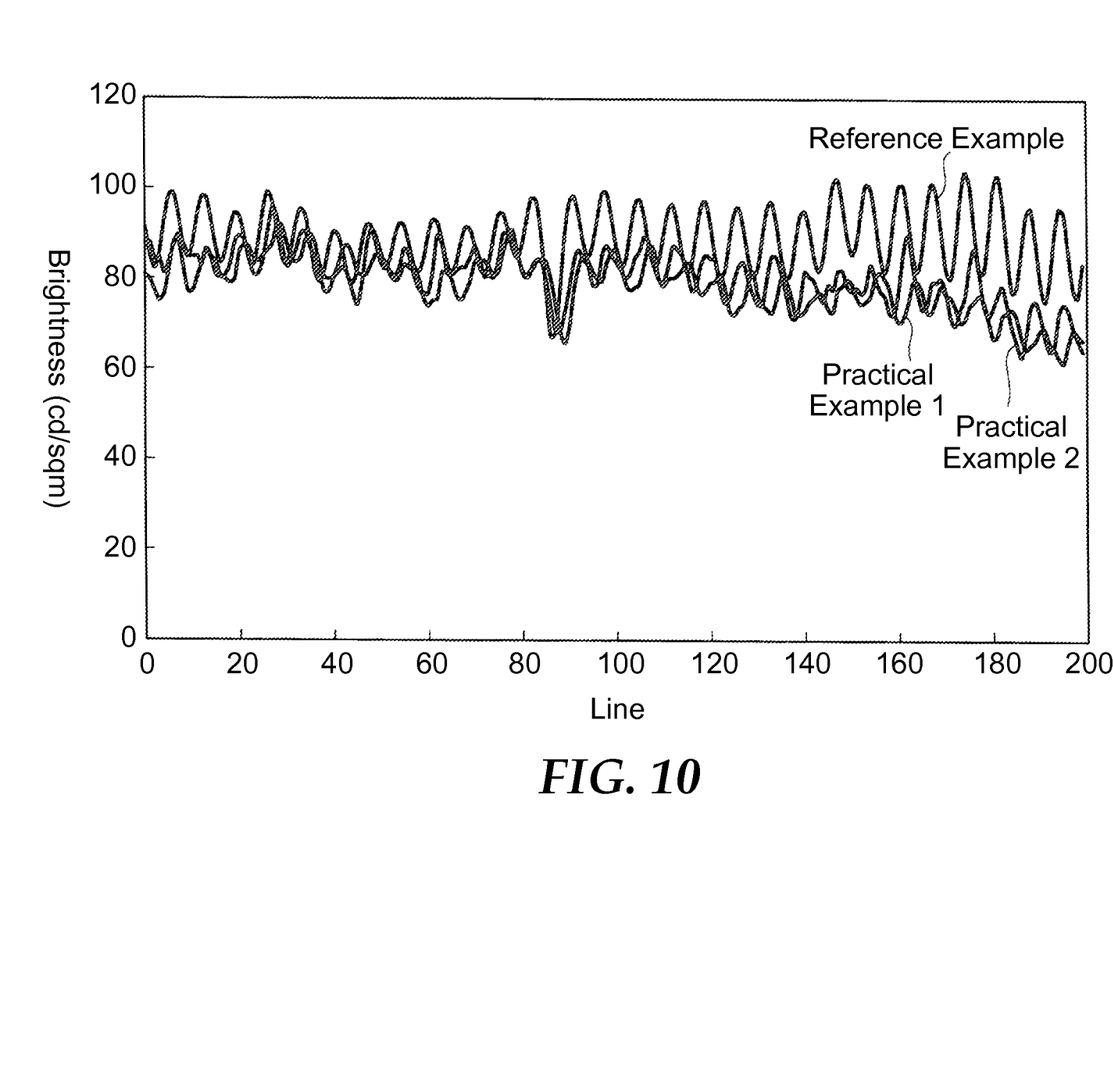
FIG. 10 shows the brightness of a liquid crystal panel for the Working Examples and the Comparative Example.
Figure 11:
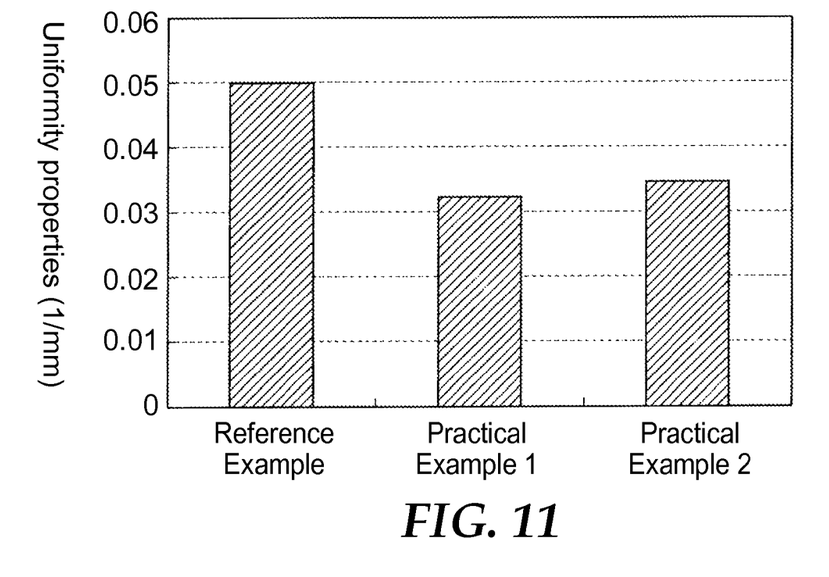
FIG. 11 shows the uniformity of the brightness of a liquid crystal panel for the Working Examples and the Comparative Example.
Figure 12:
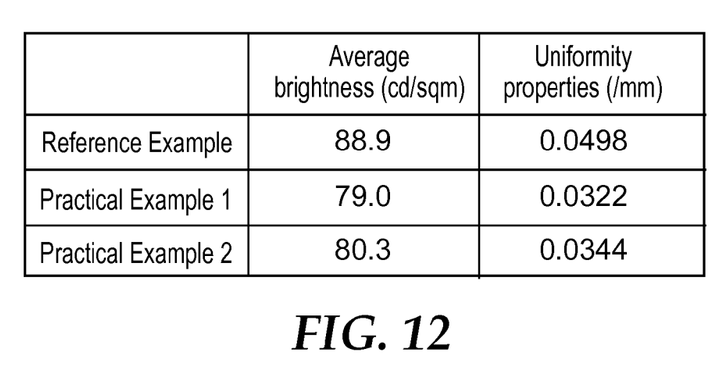
FIG. 12 summarizes the results in FIGS. 10 and 11.

Also, after measuring the brightness distribution, the uniformity of brightness was obtained by calculating the peak valley derivative amp of the brightness distribution. Smaller values indicate a higher uniformity of brightness. The evaluation results are shown in FIGS. 10 through 12. As shown in these figures, it can be seen that in Working Examples 1 and 2 the reduction in average brightness is kept down to about 10% compared with the Comparative Example, and the uniformity of brightness is increased by 40%.

In calculating the peak valley derivative amp of the brightness distribution,

1. Use data string of cross section that should be evaluated brightness uniformity, from surface brightness distribution data actually measured.
2. Use Matlab version 7.6 (MathWorks corporation) to calculate brightness bias. Subtract the measured data by the bias and get the fluctuation amplitude. The way to calculate the bias is described in the following:
   (1) Use Fourier Transform: from spatial domain to frequency domain.
   (2) Use low-pass frequency filter, filtered out the low frequency components—Then Fourier transform back to spatial domain to use as bias.
   (3) Subtract the bias from the original measured curve, and the left higher frequency components are oscillating part. Calculate the oscillation amplitude percentage by using its amplitude divided by the mean of the curve. The higher the amplitude, the worse the brightness uniformity.

In addition, brightness improvement as a result of combining the nonwoven fabric sheet with the reflective polarizing plate was evaluated. In this evaluation, a conventional diffusion plate was used for Comparative Example 1, a conventional diffusion plate combined with a reflective polarizing plate (DBEF-D3-460, manufactured by Sumitomo 3M Limited) was used for Comparative Example 2, a nonwoven fabric sheet (2 sheets of PMA013) was used for Working Example 1, and this nonwoven fabric sheet combined with a reflective polarizing plate (DBEF-D3-460, manufactured by Sumitomo 3M Limited) was used for Working Example 2.

The measurements used an EZcontrast 160D, manufactured by Eldim, to measure the brightness angular distribution of the center portion of the TV set within a darkroom. Every time each sample for measurement was replaced, 15 minutes was allowed after the TV was turned on, and after stability of brightness was confirmed the data was obtained.

Figure 13:
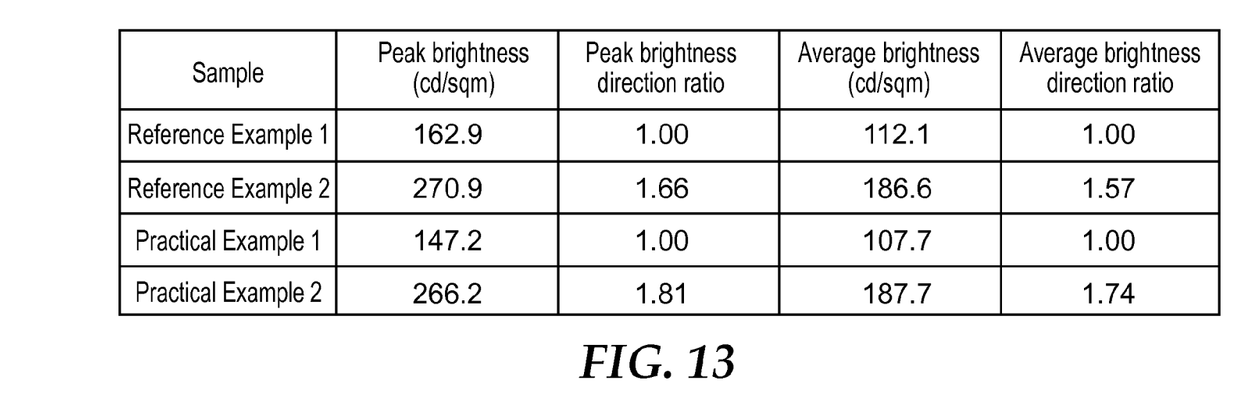
FIG. 13 shows brightness improvement of the Working Examples and the Comparative Example.

The evaluation results are shown in FIG. 13. From the results shown in this figure, it can be seen that in the Comparative Examples, the peak brightness has been increased by a factor of 1.66 and the average brightness by a factor of 1.67 as a result of combination with the reflective polarizing plate, and, in contrast, in the Working Examples, with the single sheet of nonwoven fabric, although the peak brightness and the average brightness were slightly reduced compared with the Comparative Examples, as a result of combining the reflective polarizing plate with the nonwoven fabric, the peak brightness increased by a factor of 1.81 and the average brightness increased by a factor of 1.74. Therefore, it was confirmed that a large improvement in brightness can be obtained by the combination of nonwoven fabric and reflective polarizing plate.

Likewise, brightness improvement as a result of the combination of nonwoven fabric sheet and prism sheet was confirmed. In this evaluation, a conventional diffusion plate with brightness enhancement function extracted from the 40EX700 was used for Comparative Example 1, a conventional diffusion plate combined with a prism sheet (BEF III90/50T, available from Sumitomo 3M Limited) was used for Comparative Example 2, a nonwoven fabric sheet (PMA013) was used for Working Example 1, and this nonwoven fabric sheet combined with a reflective polarizing plate (BEF III90/50T, available from Sumitomo 3M Limited) was used for Working Example 2.

The measurements used an EZcontrast 160D, manufactured by Eldim, to measure the brightness angular distribution of the center portion of the TV set within a darkroom. Every time each sample for measurement was replaced, 15 minutes was allowed after the TV was turned on, and after the stability of brightness was confirmed the data was obtained.

Figure 14:
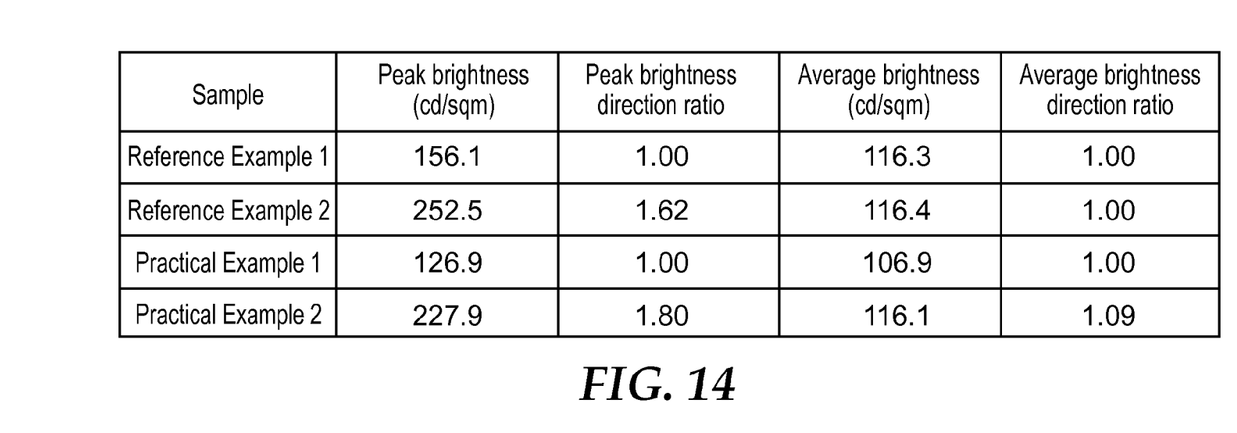
FIG. 14 shows brightness improvement of the Working Examples and the Comparative Example.

The evaluation results are shown in FIG. 14. From the results shown in this figure, it can be seen that in the Comparative Examples, the peak brightness has been increased by a factor of 1.62 and the average brightness by a factor of 1.00 as a result of combining the diffusion plate with the prism sheet. In contrast, in the Working Examples, with the single sheet of nonwoven fabric, although the peak brightness and the average brightness were slightly reduced compared with the Comparative Examples, as a result of combining the prism sheet with the nonwoven fabric, the peak brightness increased by a factor of 1.80 and the average brightness by a factor of 1.09. Therefore, it was confirmed that a large improvement in brightness can be obtained by the combination of nonwoven fabric and prism sheet.

LIST OF REFERENCE NUMBERS

10, 30 Surface light source device,
11 Light source,
12 Light guiding plate,
13 Reflection plate,
14 Diffusion plate,
15 Prism sheet,
16 Reflecting polarizing plate.

What is claimed is:
1. A surface light source device, comprising:
a light source that emits light;
a light guiding plate that guides light from the light source that is incident on a rear surface side or a side surface side and emits the light from a front surface side;
a diffusion plate disposed on the front surface side of the light guiding plate that diffuses the incident light from the light guiding plate to a front surface side; and
a reflecting polarizing plate disposed on the front surface side of the diffusion plate;
wherein the diffusion plate is made from nonwoven fabric with an areal weight of not less than 10 g/m$^2$ and not more than 40 g/m$^2$, and the diffusion plate is achromatic.
2. The surface light source device according to claim 1, wherein a prism sheet is disposed on the front surface side of the diffusion plate.
3. A surface light source device, comprising:
a light source that emits light;
a diffusion plate that diffuses to a front surface side thereof the light from the light source incident on a rear surface side thereof, and
a reflecting polarizing plate disposed on the front surface side of the diffusion plate, wherein
the diffusion plate is made from nonwoven fabric with an areal weight of not less than 10 g/m$^2$ and not more than 40 g/m$^2$, and the diffusion plate is achromatic.
4. The surface light source device according to claim 3, wherein a prism sheet is disposed on the front surface side of the diffusion plate.

* * * * *